(12) United States Patent
Rittenhouse

(10) Patent No.: US 11,085,217 B2
(45) Date of Patent: Aug. 10, 2021

(54) TAILGATE OPENING ASSEMBLY

(71) Applicant: Richard Rittenhouse, Parkersburg, WV (US)

(72) Inventor: Richard Rittenhouse, Parkersburg, WV (US)

( * ) Notice: Subject to any disclaimer, the term of this patent is extended or adjusted under 35 U.S.C. 154(b) by 139 days.

(21) Appl. No.: 16/508,933

(22) Filed: Jul. 11, 2019

(65) Prior Publication Data

US 2021/0010310 A1 Jan. 14, 2021

(51) Int. Cl.
*E05F 1/08* (2006.01)
*E05F 1/10* (2006.01)
*B62D 33/03* (2006.01)

(52) U.S. Cl.
CPC ............ *E05F 1/1016* (2013.01); *B62D 33/03* (2013.01); *E05Y 2201/484* (2013.01); *E05Y 2201/654* (2013.01); *E05Y 2900/516* (2013.01); *E05Y 2900/546* (2013.01)

(58) Field of Classification Search
CPC . E05F 1/1016; B62D 33/03; E05Y 2201/484; E05Y 2201/654; E05Y 2900/516; E05Y 2900/546
See application file for complete search history.

(56) References Cited

U.S. PATENT DOCUMENTS

| | | | |
|---|---|---|---|
| 5,954,383 A | 9/1999 | Beck | |
| 6,126,223 A * | 10/2000 | Rayburn | B60P 1/438 296/57.1 |
| 6,183,031 B1 * | 2/2001 | Ballard | B60P 1/438 296/50 |
| 6,341,809 B1 | 1/2002 | Chapman | |
| 7,029,050 B1 * | 4/2006 | Johnson | B60P 1/26 296/57.1 |
| 7,093,876 B2 | 8/2006 | Romig | |
| 7,347,476 B2 * | 3/2008 | Luehr | B60J 5/108 296/146.8 |
| 2004/0189036 A1 * | 9/2004 | Norfleet | B60P 1/438 296/57.1 |
| 2007/0132264 A1 * | 6/2007 | Koneval | B62D 33/0273 296/57.1 |
| 2007/0262603 A1 * | 11/2007 | Robertson | B60R 25/1004 296/57.1 |
| 2008/0217948 A1 | 9/2008 | Kobleman | |
| 2010/0037528 A1 | 2/2010 | Lambright | |
| 2010/0109368 A1 * | 5/2010 | Marshall | B62D 33/0273 296/57.1 |

* cited by examiner

*Primary Examiner* — Lori L Lyjak

(57) ABSTRACT

A tailgate opening assembly includes a tailgate that is hingedly coupled to a trailer. The tailgate is positionable between a closed position and an open position. A pair of biasing members is each coupled to the trailer. Each of the biasing members is biased into a compressed position and each of the biasing members is stretchable into a stretched position. A plurality of pulleys is each coupled to a respective one of the biasing members and the trailer. A pair of cables is each of the cables is routed through respective ones of the pulleys and the tailgate such that the tailgate is in mechanical communication with each of the biasing members. Each of the biasing members assists a user with opening and closing the tailgate.

4 Claims, 5 Drawing Sheets

US 11,085,217 B2

TAILGATE OPENING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to opening devices and more particularly pertains to a new opening device for assisting a user with opening and closing a trailer tailgate.

BRIEF SUMMARY OF THE INVENTION

An embodiment of the disclosure meets the needs presented above by generally comprising a tailgate that is hingedly coupled to a trailer. The tailgate is positionable between a closed position and an open position. A pair of biasing members is each coupled to the trailer. Each of the biasing members is biased into a compressed position and each of the biasing members is stretchable into a stretched position. A plurality of pulleys is each coupled to a respective one of the biasing members and the trailer. A pair of cables is each of the cables is routed through respective ones of the pulleys and the tailgate such that the tailgate is in mechanical communication with each of the biasing members. Each of the biasing members assists a user with opening and closing the tailgate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
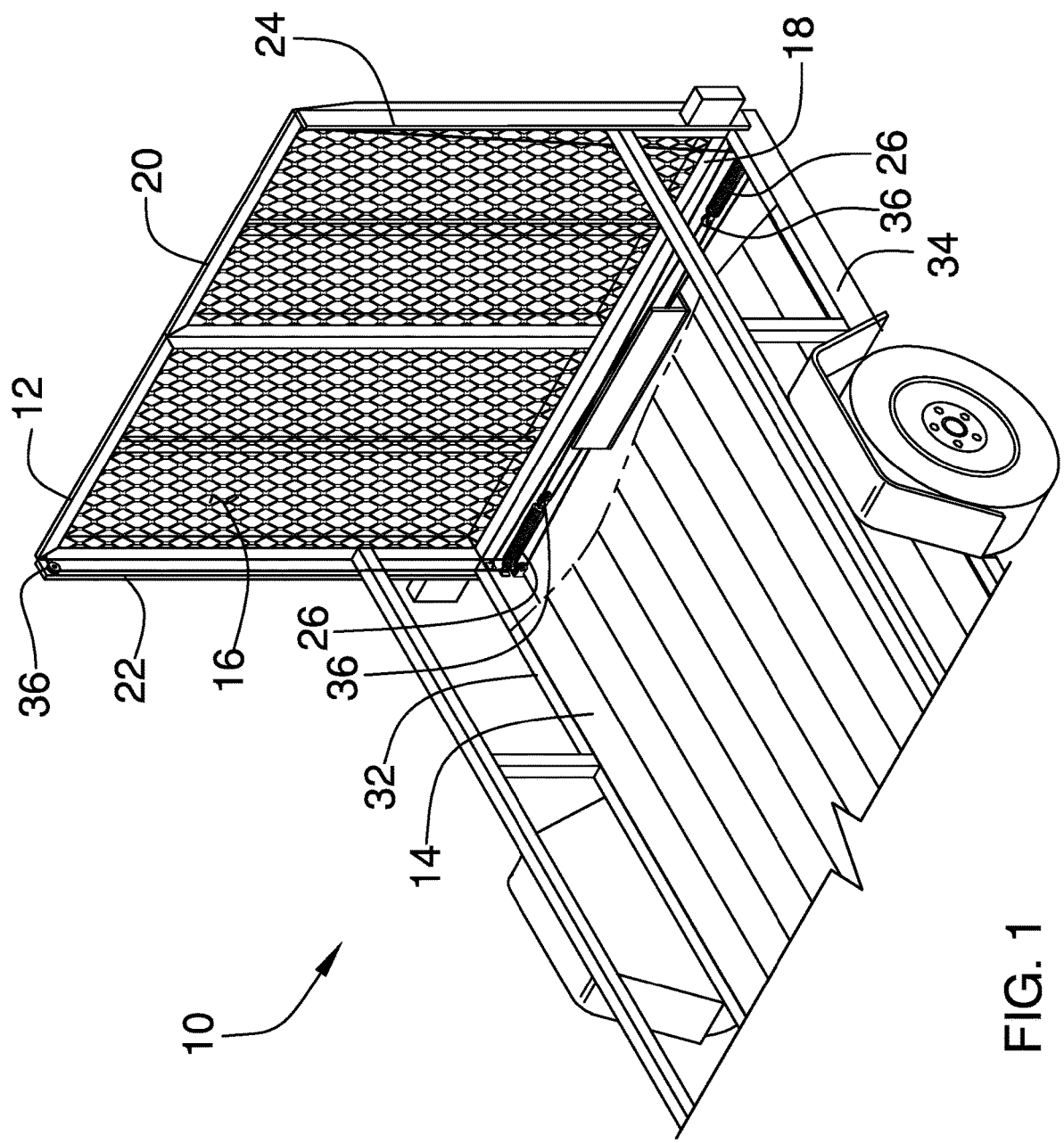
FIG. 1 is a perspective view of a tailgate opening assembly according to an embodiment of the disclosure showing a tailgate in a closed position.
Figure 2:
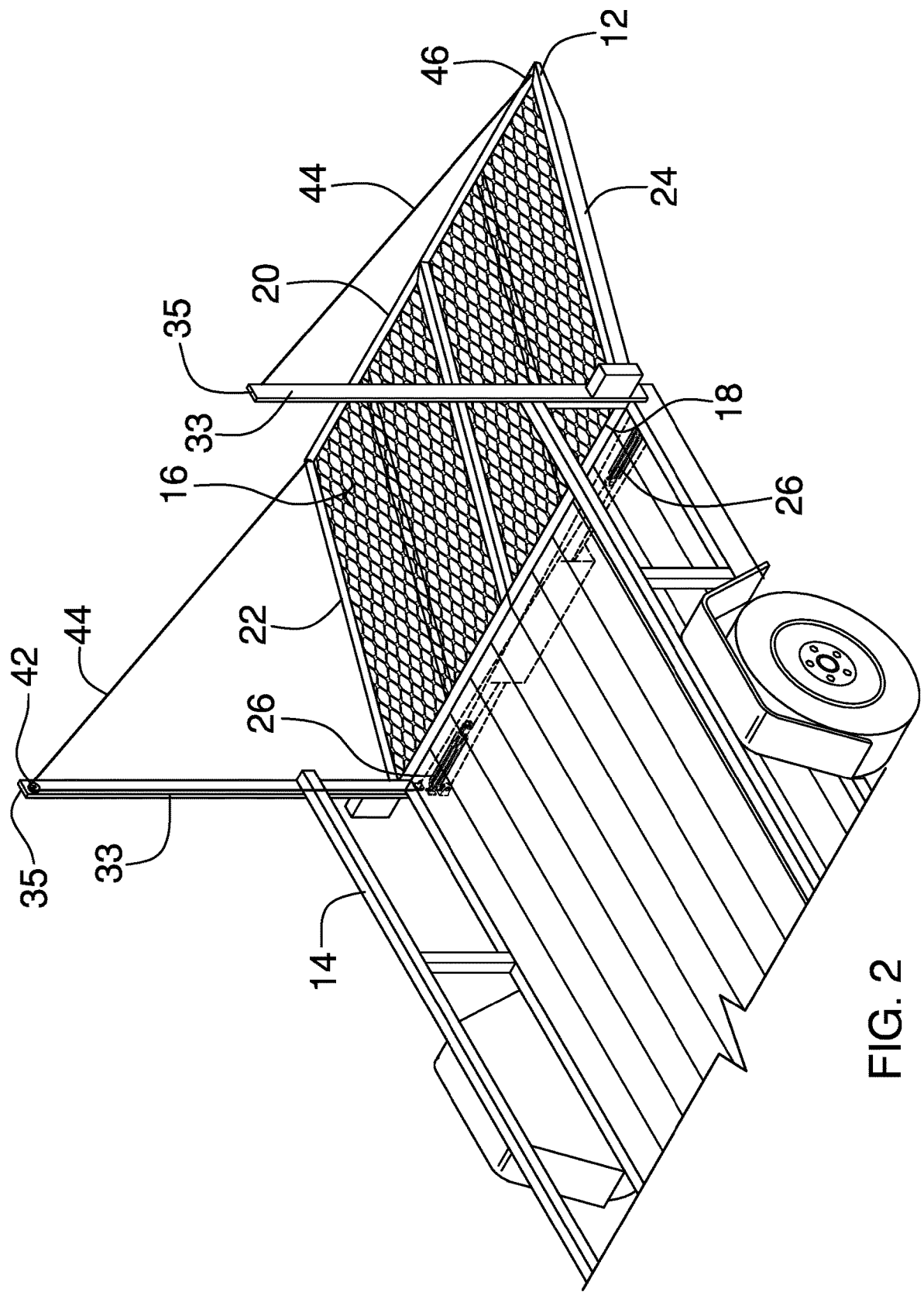
FIG. 2 is a perspective view of an embodiment of the disclosure showing a tailgate in an open position.
Figure 3:
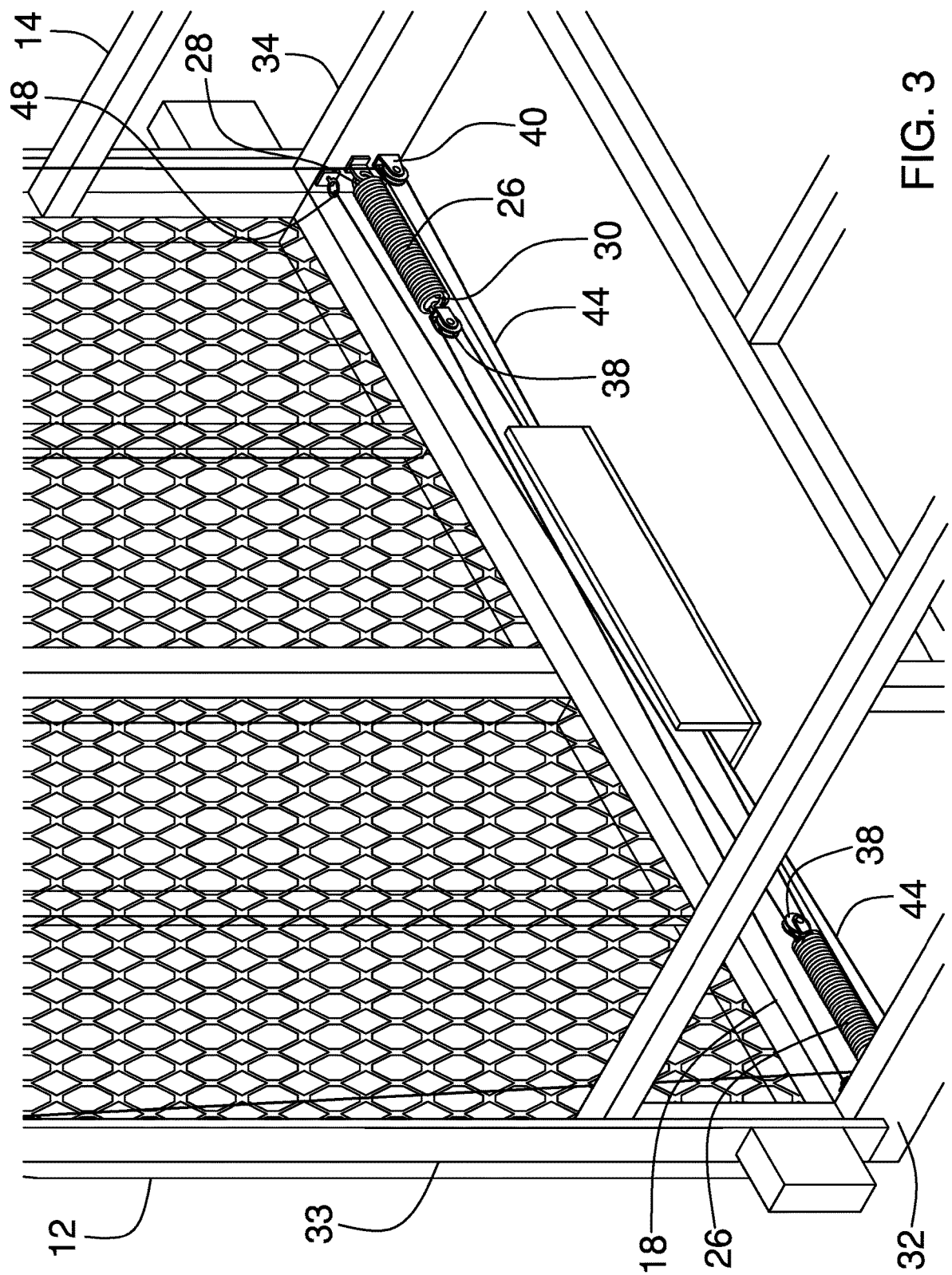
FIG. 3 is a perspective view of a pair of biasing members and a skid plate of an embodiment of the disclosure.
Figure 4:
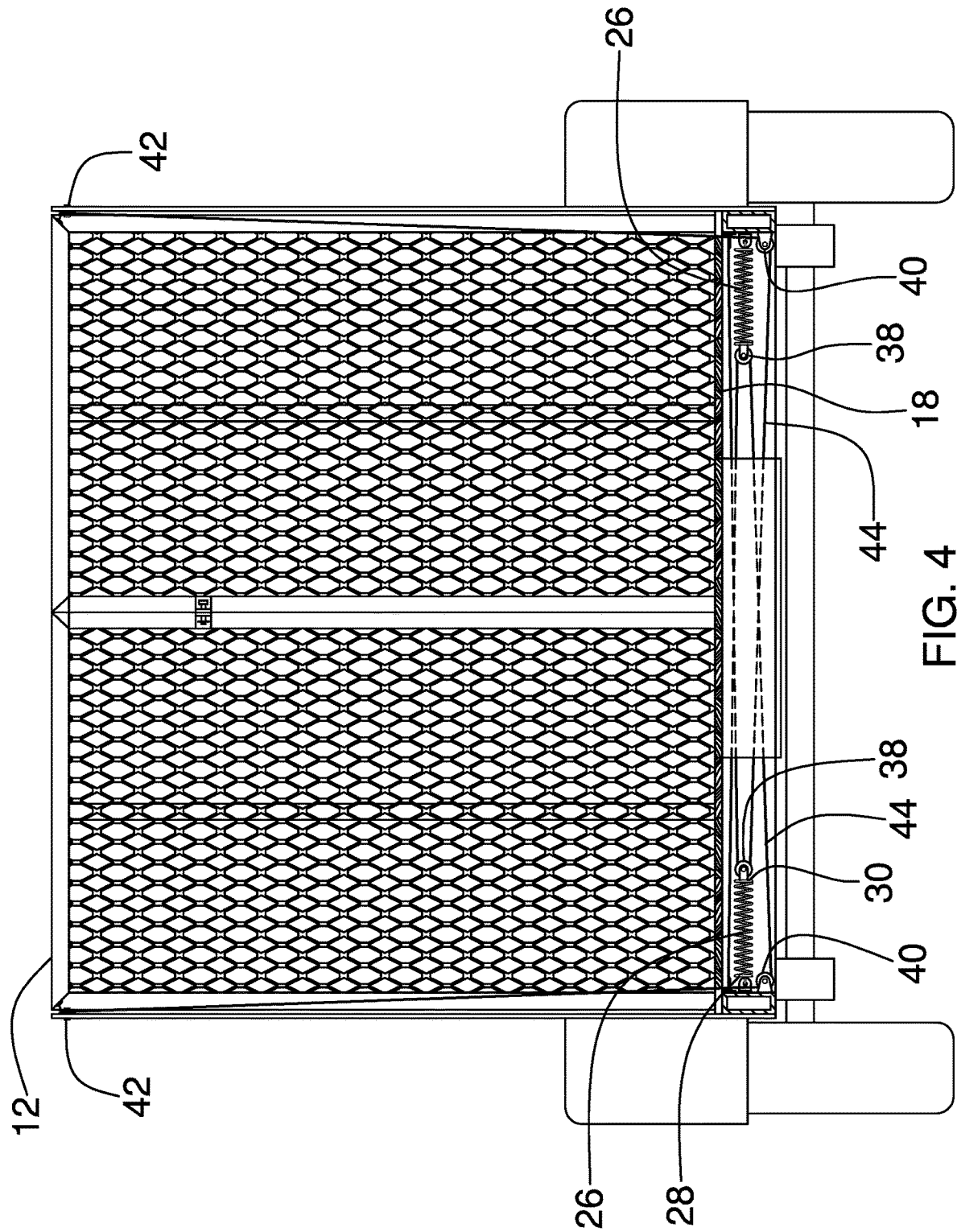
FIG. 4 is a back view of an embodiment of the disclosure.
Figure 5:
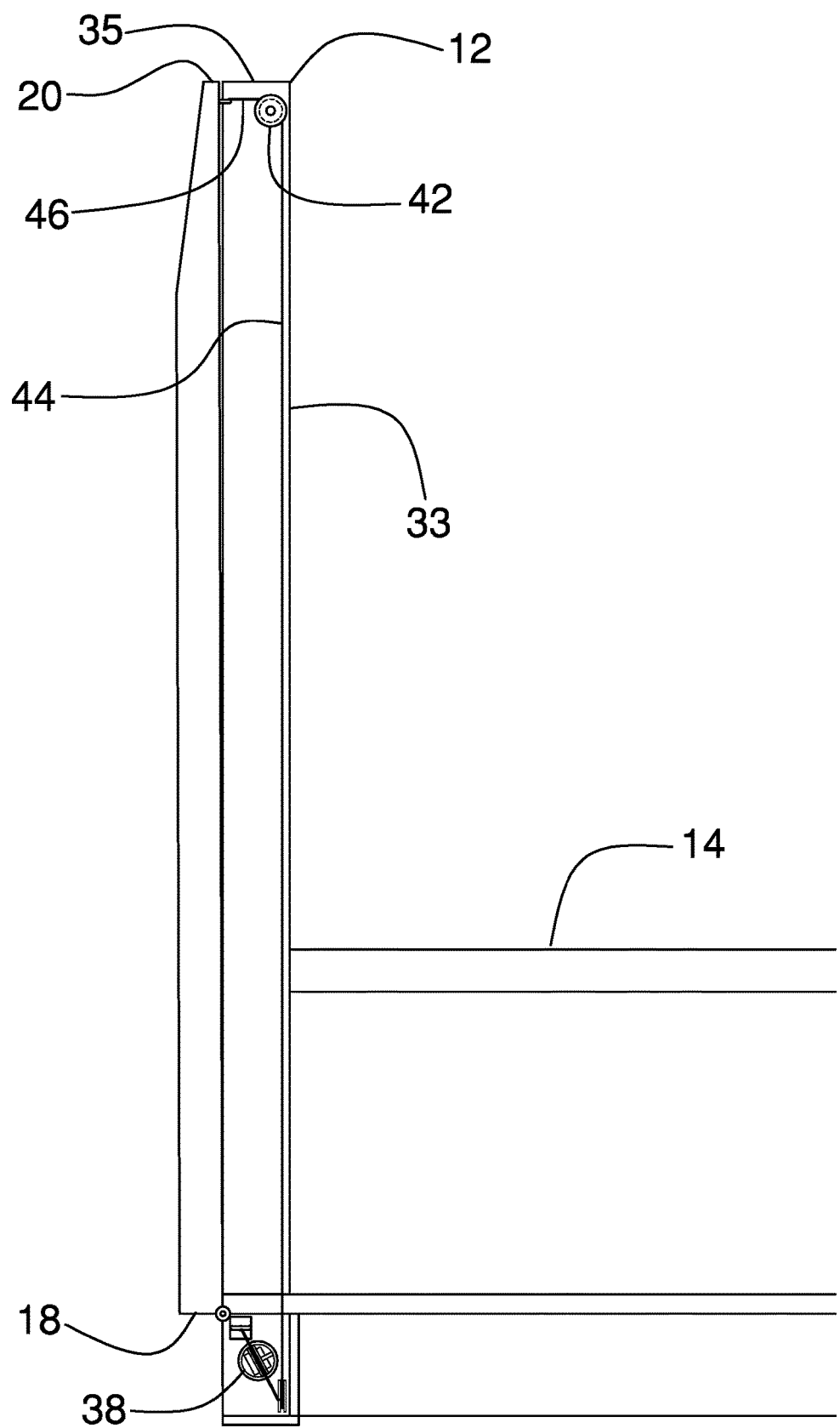
FIG. 5 is a right side view of an embodiment of the disclosure.

With reference now to the drawings, and in particular to FIGS. 1 through 5 thereof, a new opening device embodying the principles and concepts of an embodiment of the disclosure and generally designated by the reference numeral 10 will be described.

As best illustrated in FIGS. 1 through 5, the tailgate opening assembly 10 generally comprises a tailgate 12 that is hingedly coupled to a trailer 14. The tailgate 12 has a top surface 16, a bottom edge 18, a top edge 20, a first lateral edge 22 and a second lateral edge 24. The bottom edge 18 is hingedly coupled to the trailer 14 and the tailgate 12 is positionable between a closed position and an open position. The trailer 14 may be a flatbed trailer or other type of cargo trailer that can be towed behind a passenger vehicle. Additionally, the tailgate 12 may be a tailgate on the bed of a cargo vehicle, such as a pickup or the like.

A pair of biasing members 26 is provided and each of the biasing members 26 is coupled to the trailer 14. Each of the biasing members 26 is biased into a compressed position and each of the biasing members 26 is stretchable into a stretched position. Each of the biasing members 26 has a first end 28 and a second end 30. The first end 28 of each of the biasing members 26 is coupled to a respective one of a first lateral side 32 or a second lateral side 34 of the trailer 14. Each of the biasing members 26 may comprise a spring, a gas charged piston or other type of mechanical biasing member. Additionally, each of the biasing members 26 may have a tension force that is equivalent to approximately 75.0 percent of the weight of the tailgate 12.

A pair of uprights 33 is provided and each of the uprights 33 is coupled to and extends upwardly from the trailer 14. The tailgate 12 abuts the uprights 33 when the tailgate 12 is in the closed position. Additionally, each of the uprights 33 is positioned on a respective one of the first lateral side 32 or the second lateral side 34 of the trailer 14. Each of the uprights 33 has a distal end 35 with respect to the trailer 14.

A plurality of pulleys 36 is provided and each of the pulleys 36 is coupled to a respective one of the biasing members 26 and the trailer 14. The plurality of pulleys 36 includes a set tension pulleys 38, a set of trailer pulleys 40 and a set of guide pulleys 42. Each of the tension pulleys 38 is coupled to the second end 30 of a respective one of the biasing members 26. Each the trailer pulleys 40 is coupled to a respective one of the first lateral side 32 or the second lateral side 34 of the trailer 14. Each of the trailer pulleys 40 is positioned adjacent to a respective one of the biasing members 26. Each of the guide pulleys 42 is coupled to the distal end 35 of a respective one of the uprights 33.

A pair of cables 44 is provided and each of the cables 44 is routed through respective ones of the pulleys 36 and the tailgate 12. Thus, the tailgate 12 is in mechanical communication with each of the biasing members 26. Each of the biasing members 26 is stretched into the stretched position when the tailgate 12 is positioned into the open position. Conversely, each of the biasing members 26 is biased into the compressed position when the tailgate 12 is urged into the closed position. In this way each of the biasing members 26 assists a user with closing the tailgate 12.

Each of the cables 44 has a primary end 46 and a secondary end 48. The primary end 46 of each of the cables 44 is coupled to the top surface 16 of the tailgate 12 at a point that is aligned with the top edge 20 of the tailgate 14. The secondary end 48 of each of the cables 44 is coupled to a respective one of the first lateral side 32 or the second lateral side 34 of the trailer 14. Each of the cables 44 is routed through a respective one of the guide pulleys 42, a respective one of the tension pulleys 38 and a respective one of the trailer pulleys 40.

A plurality of eyebolts 50, or other type of fastener, may be provided and each of the eyebolts 50 may be coupled to a respective one of the trailer 14 and the tailgate 12. Each of the eyebolts 50 on the tailgate 12 may be positioned at the point to which respective ones of the cables 44 are attached. Each of the eyebolts 50 on the trailer 14 may be positioned on a respective one of the first lateral side 32 or the second lateral side 34 of the trailer 14. Each of the cables 44 may be coupled to respective ones of the eyebolts 50. Moreover, the eyebolts 50 may be threaded inwardly or outwardly for adjusting tension on the cables 44. A skid plate 52 is provided and the skid plate 52 is coupled to the bottom edge 18 of the tailgate 12. Each of the cables 44 extends over the skid plate 52 such that the skid plate 52 inhibits the cables 44 from being caught on an object when the trailer 14 is in use.

In use, the user grips the tailgate 12 to urge the tailgate 12 into the open position for accessing the trailer 14. Each of the biasing members 26 is stretched when the tailgate 12 is lowered into the open position. In this way the biasing members 26 reduce the weight of the tailgate 12 when the user is lowering the tailgate 12 to the ground. The user grips the tailgate 12 and lifts the tailgate 12 to move the tailgate 12 into the closed position. Each of the biasing members 26 pulls on the cables 44 when the tailgate 12 is lifted thereby assisting the user to lift the tailgate 12 into the closed position. In this way the biasing members 26 assist a physically disabled user to open and close the tailgate 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tailgate opening assembly being configured to assist a user with opening and closing a tailgate, said assembly comprising:

a tailgate being hingedly coupled to a trailer, said tailgate being positionable between a closed position and an open position;

a pair of biasing members, each of said biasing members being coupled to the trailer, each of said biasing members being biased into a compressed position, each of said biasing members stretchable into a stretched position;

a plurality of pulleys, each of said pulleys being coupled to a respective one of said biasing members and the trailer;

a pair of cables, each of said cables being routed through respective ones of said pulleys and said tailgate such that said tailgate is in mechanical communication with each of said biasing members, each of said biasing members being stretched into said stretched position when said tailgate is positioned into said open position, each of said biasing members being biased into said compressed position when said tailgate is urged into said closed position wherein each of said biasing members is configured to assist a user with opening and closing said tailgate;

wherein said tailgate has a top surface, a bottom edge, a top edge, a first lateral edge and a second lateral edge, said bottom edge being hingedly coupled to the trailer;

wherein each of said biasing members has a first end and a second end, said first end of each of said biasing members being coupled to a respective one of a first lateral side or a second lateral side of the trailer;

a pair of uprights, each of said uprights being coupled to and extending upwardly from the trailer, said tailgate abutting said uprights when said tailgate is in said closed position, each of said uprights being positioned on a respective one of the first lateral side or the second lateral side of the trailer, each of said uprights having a distal end with respect to the trailer; and wherein said plurality of pulleys includes a set tension pulleys, a set of trailer pulleys and a set of guide pulleys.

2. The assembly according to claim 1, wherein:

each of said tension pulleys is coupled to said second end of a respective one of said biasing members;

each said trailer pulleys is coupled to a respective one of the first lateral side or the second lateral side of the trailer, each of said trailer pulleys being positioned adjacent to a respective one of said biasing members; and each of said guide pulleys is coupled to said distal end of a respective one of said uprights.

3. A tailgate opening assembly being configured to assist a user with opening and closing a tailgate, said assembly comprising:

a tailgate being hingedly coupled to a trailer, said tailgate being positionable between a closed position and an open position;

a pair of biasing members, each of said biasing members being coupled to the trailer, each of said biasing members being biased into a compressed position, each of said biasing members stretchable into a stretched position;

a plurality of pulleys, each of said pulleys being coupled to a respective one of said biasing members and the trailer;

a pair of cables, each of said cables being routed through respective ones of said pulleys and said tailgate such that said tailgate is in mechanical communication with each of said biasing members, each of said biasing members being stretched into said stretched position when said tailgate is positioned into said open position, each of said biasing members being biased into said compressed position when said tailgate is urged into said closed position wherein each of said biasing members is configured to assist a user with opening and closing said tailgate;

wherein said tailgate has a top surface, a bottom edge, a top edge, a first lateral edge and a second lateral edge, said bottom edge being hingedly coupled to the trailer;

wherein each of said biasing members has a first end and a second end, said first end of each of said biasing members being coupled to a respective one of a first lateral side or a second lateral side of the trailer;

a pair of uprights, each of said uprights being coupled to and extending upwardly from the trailer, said tailgate abutting said uprights when said tailgate is in said closed position, each of said uprights being positioned on a respective one of the first lateral side or the second lateral side of the trailer, each of said uprights having a distal end with respect to the trailer; and wherein each of said cables has a primary end and a secondary end, said primary end of each of said cables being coupled to said top surface of said tailgate at a point being aligned with said top edge of said tailgate, said secondary end of each of said cables being coupled to a respective one of the first lateral side or the second lateral side of the trailer, each of said cables being routed through a respective one of said guide pulleys, a respective one of said tension pulleys and a respective one of said trailer pulleys.

4. A tailgate opening assembly being configured to assist a user with opening and closing a tailgate, said assembly comprising:

a tailgate being hingedly coupled to a trailer, said tailgate having a top surface, a bottom edge, a top edge, a first lateral edge and a second lateral edge, said bottom edge being hingedly coupled to the trailer, said tailgate being positionable between a closed position and an open position;

a pair of biasing members, each of said biasing members being coupled to the trailer, each of said biasing members being biased into a compressed position, each of said biasing members stretchable into a stretched position, each of said biasing members having a first end and a second end, said first end of each of said biasing members being coupled to a respective one of a first lateral side or a second lateral side of the trailer;

a pair of uprights, each of said uprights being coupled to and extending upwardly from the trailer, said tailgate abutting said uprights when said tailgate is in said closed position, each of said uprights being positioned on a respective one of the first lateral side or the second lateral side of the trailer, each of said uprights having a distal end with respect to the trailer;

a plurality of pulleys, each of said pulleys being coupled to a respective one of said biasing members and the trailer, said plurality of pulleys including a set tension pulleys, a set of trailer pulleys and a set of guide pulleys, each of said tension pulleys being coupled to said second end of a respective one of said biasing members, each said trailer pulleys being coupled to a respective one of the first lateral side or the second lateral side of the trailer, each of said trailer pulleys being positioned adjacent to a respective one of said biasing members, each of said guide pulleys being coupled to said distal end of a respective one of said uprights; and a pair of cables, each of said cables being routed through respective ones of said pulleys and said tailgate such that said tailgate is in mechanical communication with each of said biasing members, each of said biasing members being stretched into said stretched position when said tailgate is positioned into said open position, each of said biasing members being biased into said compressed position when said tailgate is urged into said closed position wherein each of said biasing members is configured to assist a user with opening and closing said tailgate, each of said cables having a primary end and a secondary end, said primary end of each of said cables being coupled to said top surface of said tailgate at a point being aligned with said top edge of said tailgate, said secondary end of each of said cables being coupled to a respective one of the first lateral side or the second lateral side of the trailer, each of said cables being routed through a respective one of said guide pulleys, a respective one of said tension pulleys and a respective one of said trailer pulleys.

\* \* \* \* \*